US 6,744,769 B1

(12) United States Patent
Siu et al.

(10) Patent No.: US 6,744,769 B1
(45) Date of Patent: Jun. 1, 2004

(54) PATH PROVISIONING ON RING-BASED NETWORKS

(75) Inventors: Ernest Y. B. Siu, Ottawa (CA); Wayne D. Grover, Edmonton (CA)

(73) Assignee: Nortel Networks Limited, St. Laurent (CA)

( * ) Notice: Subject to any disclaimer, the term of this patent is extended or adjusted under 35 U.S.C. 154(b) by 621 days.

(21) Appl. No.: 09/691,268

(22) Filed: Oct. 19, 2000

(51) Int. Cl.[7] .............................................. H04L 12/28
(52) U.S. Cl. ............. 370/395.32; 370/222; 370/395.51; 359/119; 359/124
(58) Field of Search .................. 370/221–224, 370/248, 249, 258, 351, 352, 357, 389, 395.1, 395.2, 395.32, 395.51, 401; 359/109, 110, 114, 115, 119, 124, 135–139

(56) References Cited

U.S. PATENT DOCUMENTS

| | | | |
|---|---|---|---|
| 5,390,164 A | | 2/1995 | Kremer |
| 5,394,389 A | | 2/1995 | Kremer |
| 5,406,549 A | | 4/1995 | Kremer |
| 5,440,540 A | | 8/1995 | Kremer |
| 5,537,393 A | * | 7/1996 | Shioda et al. ............... 370/223 |
| 5,657,142 A | * | 8/1997 | Fahim ........................ 370/238 |
| 5,859,836 A | * | 1/1999 | Eslambolchi ............... 370/222 |
| 5,959,986 A | * | 9/1999 | Nelson et al. .............. 370/351 |
| 6,094,417 A | * | 7/2000 | Hansen et al. .............. 370/222 |

OTHER PUBLICATIONS

Unavailability Analysis of Long–Haul Networks.
Resource Management for Fault Tolerant Path Structures in Sonet Ring Networks.
Alternative Routing Strategies for High Availability Paths in Sonet Ring Networks.

* cited by examiner

Primary Examiner—Hassan Kizou
Assistant Examiner—David Odland

(57) ABSTRACT

A mechanism for path provisioning between an origin node (O) and a destination node (D) over BLSR networks. All ring pairs including O and D are examined and a communications path is calculated for each valid ring sequence. The calculated path is compared with the current best path until an optimal path is found. Significantly improved run-time is obtained using ring sequence reduction (RS-R) and path construction reduction (PC-R) while the quality solution set is maintained. A path provisioning tool calculates the optimal path and a Pareto curve for the BLSR network. The optimal path displays inter-ring connection configurations, the signal flows, and associated data like cost and unavailability. The Pareto curve allows various levels of assured availability to be provided while keeping the cost to a minimum.

43 Claims, 11 Drawing Sheets

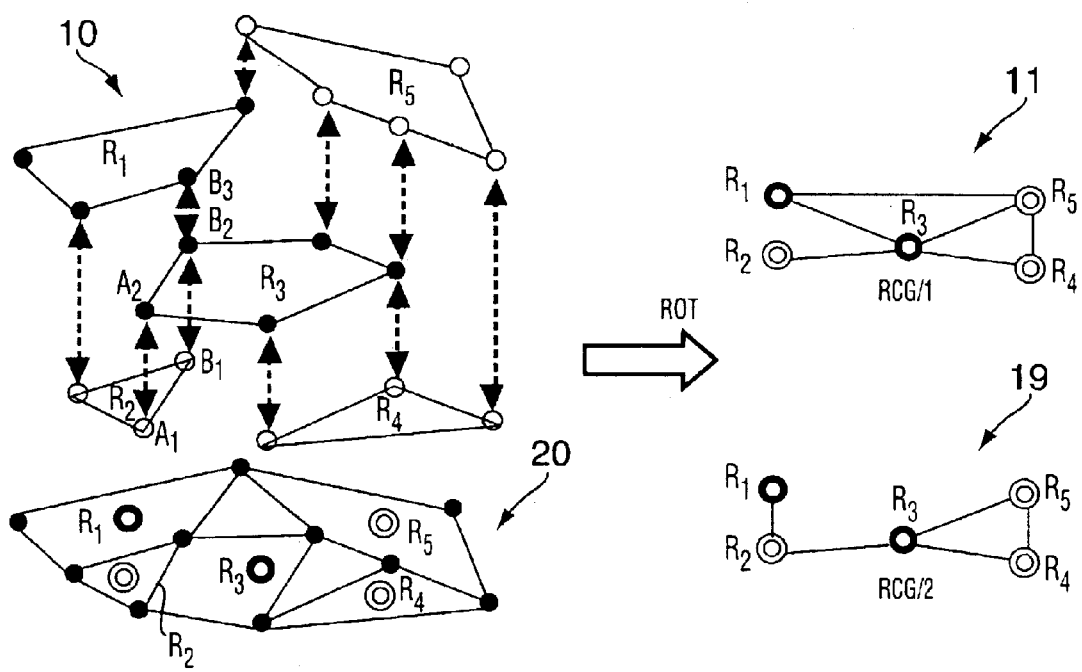
FIG. 3
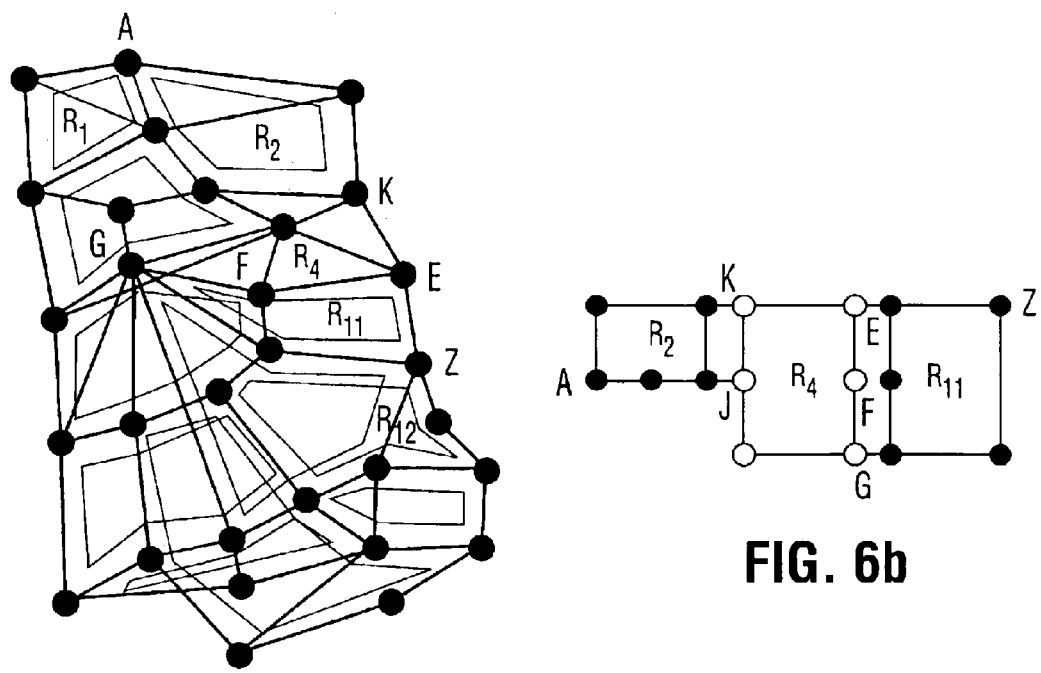
FIG. 4
FIG. 6b

PATH PROVISIONING ON RING-BASED NETWORKS

BACKGROUND OF THE INVENTION

1. Field of Invention

The present invention generally relates to communications systems connectivity, and in particular to a mechanism for path provisioning on ring-based networks.

2. Related Art

The availability of communication systems has become more and more important as different sectors of society increasingly utilize communication services such as voice, data, video and Internet traffic. As businesses and the general public become more dependent on these services, the availability requirement grows to an extent that is similar or higher than for other utility services. Moreover, different customers have different requirements in terms of cost and availability.

In the emerging field of deploying and providing high quality services, network operators are most interested in the ability to analyse the cost and availability of a path for providing the customers with reliable end-to-end connection at a minimum cost. The current generation of transport networks carry a high volume of traffic on fiber optics predominantly on SONET (synchronous optical network) transmission technology, and more recently on DWDM (dense wavelength division multiplexing) networks For example, an optical carrier OC-1 link carries more than 156,000 voice circuits or their equivalent, if rated at 64 kbps each. The unavailability of such a link may have a drastic impact on businesses and the community.

There are several ways to measure network integrity, namely restorability, reliability, and availability.

Restorability represents system's ability to restore the traffic after failure, e.g. fiber/wire cut or equipment failure, within a target time, using restoration/rerouting mechanisms.

SONET architectures, like bi-directional line switched ring (BLSR) networks, or (1+1) linear networks, provide 100% restorability upon single element failure.

Reliability is the probability that a system or device will operate for a specified amount of time without a service-affecting failure.

Availability is a relevant measurement on cost-effectiveness and customer needs for quality end-to-end communications paths. End-to-end connections represent the main service offered by service providers, and the perception of quality of service (QoS) is based generally on the availability of this service.

Availability measures the ability of the network to continuously maintain traffic and reflects the probability that a system is operating satisfactorily at any randomly chosen, assuming an ongoing balance between failure and subsequent repairing.

The expression for network availability is:

$$A=MTBF/(MTBF+MTTR),$$

where MTBF is the mean time between failures, and MTTR is the mean time to repair.

If we note with "U" the normalized value of network unavailability, availability (A) may be determined by adding up all the unavailability (U) scenarios and calculating the network availability as $A=1-U$.

A simple point-to-point SONET transmission system consists of two network elements connected with fiber optic cables A network element is usually referred to as a "node", and the fiber link between two nodes (including any line regenerators) is referred to as a "span" regardless of the number of physical fibers.

SONET uses dedicated protection facilities, so that in general 50% of the fiber and the equipment is used by the working traffic, and the remaining 50% is reserved for accommodating the traffic in case of failure. Thus, linear network architectures use (1+1), (1:1), or (1:N) protection schemes, while ring networks architectures use UPSR (unidirectional protection switched ring) and SLSR as protection mechanisms.

With the emerging WDM (wavelength division multiplexing) mesh traffic patterns become more popular. The mesh network topology is essentially a set of point-to-point links between nodes. Therefore, mesh networks generally use different protection protocols than linear and ring networks because there are usually at least two available paths between any two nodes. Thus, mesh restoration does not require dedicated protection and the spare capacities are shared for restoring affected connections.

End-to-end availability analysis of a path over a hypothetical ladder-like network is addressed by M. To and P. Neusy, "Unavailability Analysis of Long-Haul Networks", IEEE Journal on Selected Areas in Communications, Vol.12, No.1, January 1994. The authors considered the availability of SONET and digital system DS3 as well as certain digital cross-connect restoration and end-to-end diversity routing. This study does not disclose path construction on ring networks and ring interconnection configurations.

W. D. Grover disclosed in "Alternative Routing Strategies for High Availability Paths in SONET Ring Networks, TRLabs, January 1998, and in "Resource Management for Fault Tolerant Path Structures in SONET Ring Networks", JNSM 1997, June 1998, the mathematical model of availability for three mechanisms used to inter-connect rings, namely single-feeding (SF), matched-nodes (MN) and dual feeding (DF).

FIG. 1a illustrates an SF inter-ring configuration where the signal arriving on Ring-1 passes through an inter-ring connection 12 to Ring-2. Each inter-ring connection point 13 or 16, has an add-drop multiplexer (ADM) present at a common physical site, or point-of-presence (POP). These two ADMs are referred to as gateways. It is also possible to have more than one physical links 12, which implies a corresponding number of ADM pairs. The "cross-office wiring" connection 12 is used to connect the two gateways through ADMs. The SF cost is the lowest of the three inter-ring connection configurations. It is evident that a single element failure on inter-ring connection 12, will cause system outage and may dramatically reduce the end-to-end availability.

FIG. 1b illustrates an MN inter-ring configuration, having inter-ring connections 13, 15, as physical links between Ring-1 and Ring-2. There are two inter-ring gateway pairs namely W-Y and X-Z, with W and Y designated as the primary (P) gateways, and X and Z as the secondary (S) gateways.

In this configuration, the incoming signal from node A is dropped at node W to node Y, while the original signal continues to node X and passes to node Z using the inter-ring connection 16. The duplicated signal arriving at node Z from node Y is sent back to node Y and terminated if the primary inter-ring connection 13 is operational. If the inter-ring connection 15 is cut, the primary signal on line 13 is used.

The MN configuration is redundant and protected from single-element and most dual-element failures, at the inter-ring connection site. However, the cost is considerably higher compared to the SF configuration.

As shown in FIG. 1c, in a DF inter-ring configuration, each inter-ring connection 17, 18, has two physical links between the two rings. The DF configuration uses two pairs of gateways [W-Y] and [X-Z] for each inter-ring connection point. Two copies of the same incoming signal travel through physical links 17 and 18, on paths (AWYB) and (VXZQ) without rejoining. The DF configuration is protected from all single-element and most dual-element (different set of combinations from MN) failures on inter-ring connection. Due to the duplication of signals, the DF configuration uses more bandwidth than the MN configuration. However, the DF configuration can cost less than the MN configuration particularly when rings are small or the distance between entry and egress nodes, e.g. W-Y or X-Z, is large.

FIGS. 2a, 2b, 2c, illustrate how the signal flows are configured at the inter-ring sites from an origin node (O) to a destination node (D) for single feeding (SF), matched nodes (MN), and dual feeding (DF) configurations, respectively.

There is a need for a path provisioning mechanism over survivable ring networks using combined matched-nodes (MN) and dual feeding (DF) configurations providing dual redundancy at the inter-ring connection site and cost/availability efficiency.

SUMMARY OF THE INVENTION

The present invention seeks to overcome the disadvantages of the prior art associated with inter-ring systems connectivity over ring-based networks.

According to one aspect of the invention, a method for provisioning a communications path between an origin node (O) and a destination node (D) in a bi-directional fine switched ring (BLSR) network, the "O" and "D" nodes being ascribed to a plurality of OD ring pairs, is provided The method comprises the steps of identifying an OD ring pair out of said plurality of OD ring pairs; selecting a ring sequence out of a plurality of valid ring sequences corresponding to the identified OD ring pair; calculating a current path associated with the selected ring sequence; comparing the current path with a current best path available from a database and continuously updating the database with the best current path; successively assigning inter-ring connection configurations and repeating steps (d) and (e) until a first communications path is obtained; repeating steps (b) to (e) for each valid ring sequence until a second communications path is obtained; and repeating steps (a) to (f) for each OD ring pair until an optimal path is found.

The ring sequence and/or the path construction reductions according to the present method provide for a practical decision in an acceptable period of time while maintaining the quality solutions set intact.

According to another aspect of the invention, a computer-readable medium containing computer executable instructions for performing the steps of the above method, is also provided.

According to a further aspect of the invention, there is provided an apparatus for path provisioning over SLSR networks including means for inputting path search requirements, means for calculating an optimal path between "O" and "D" nodes, and means for outputting the graph of the optimal path containing inter ring connection configurations and associated reporting data like the path cost (C), network unavailability (U), the strategy used for searching, and the elapsed time of the search.

Advantageously, the path provisioning apparatus of the invention provides an optimal O-D communications path in terms of cost ĉ and availability (U). The apparatus can provision the optimal communications path using a single objective optimization function like minC, or minU. If one of these parameters is used as a single objective optimization function with the other parameter used as a constraint, the mechanism of the present invention provides an optimal communications path in terms of either minimum cost with a maximum associated unavailability (minC/maxU), or minimum availability with a maximum associated cost (minU/maxC).

The present invention is not limited to the features disclosed in the "Summary of the Invention" section; it nonetheless may reside on sub-combinations of the disclosed features.

DESCRIPTION OF THE DRAWINGS

The present invention and its advantages will be better understood from the following description of the embodiments of the invention illustrated in the drawings, where:

FIG. 3 illustrates an exploded view of a network and ring overlay transformation (ROT) using two criteria;

FIG. 4 illustrates a ring network topology identifying an O-D node pair and the associated OD rings;

FIG. 6b is a graph illustrating a ring sequence between "O" and "D" nodes;

Figure 1A:
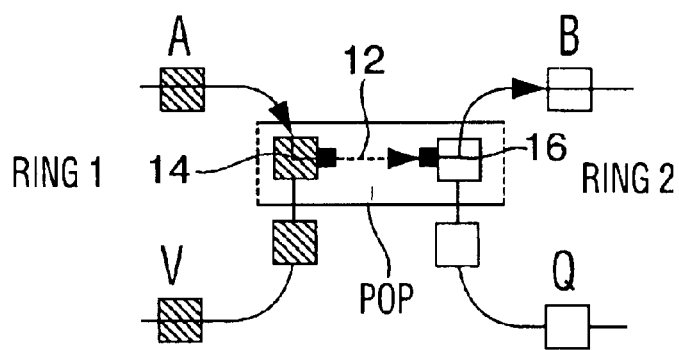
FIGS. 1a, 1b, 1c, illustrate conventional inter-ring connection configurations.

Similar references are used in different figures to denote similar components.

DETAILED DESCRIPTION OF THE PREFERRED EMBODIMENTS

The following description relates to preferred embodiments of the invention by way of example only and without limitation to the combination of features necessary for carrying the invention into effect.

The topology of a network may be illustrated by a graph which consists of nodes connected by fiber cables, or spans. Each node represents a point-of-presence (POP), e.g. a central office, which is the physical location where the network provider operates network equipment. However, a node on the network topology does not necessary imply the existence of a network active element on that physical site. The term "graph" will be inter changeably used with the term "network topology graph" throughout the description. The graph includes nodes and spans to illustrate a point-of-presence (POP) and the existing fiber cables of the physical network.

An add/drop multiplexer (ADM) is a piece of equipment placed in a POP which can add, drop, and pass through traffic.

A ring is a collection of ADMs linked by spans and forming a closed cycle. A ring connectivity graph (RCG) is a graph representation illustrating the node connectivity in a ring-based network.

The cost of an end-to-end communications path is the summation of all intra-ring path segments costs, the inter-ring connecting equipment cost, and the cost of the origin and destination nodes for the origination and termination of the signal.

With the available inter-ring connection configurations (SF, MN, DF), an end-to-end path with no single points of failure can be provisioned using combinations of these inter-ring connections. It is to be noted that, single feeding (SF) should not be combined with MN and DF for availability considerations.

An inter-ring connection configurations comparison is shown in Table 1.

TABLE 1

| | Provisioning Cost | Availability | Symbol |
|---|---|---|---|
| Single-Feeding | LOW | GOOD | |
| Matched-Node | HIGH | EXCELLENT | |
| Dual-Feeding | HIGH | EXCELLENT | |
| Mixed MN/DF | REDUCED | EXCELLENT | |

On a ring-by-ring basis, it can easily be concluded that the SF configuration has the lowest cost and the lowest network availability when compared to either MN or DF configurations, based on the fact that MN and DF are dually redundant.

The applicability of MN or DF configurations is quite balanced in terms of path cost ĉ and network availability (U), and the decision on which configuration is to be applied depends on the configuration setup of the intra-ring path. For network availability (U), the decision to use either MN or DF can be also made on a ring-by-ring basis. Unavailability (U) calculation is different for each of the above inter-ring configurations. The optimization solutions will be referred to as "minimizing cost" (minC), and "minimizing unavailability" (minU).

FIG. 3 illustrates at 20 a ring-based transport network including rings R1–R5, while the top part illustrates at 10 a ring topology including rings R1 to R5 as an exploded view. Each ring R1–R5 represents a SONET/BLSR with the network elements physically located at the POP.

The vertical dotted arrows represent actual inter-ring connections, or cross-office connections. For example, R2 and R3 have a pair of network elements, i.e. add/drop multiplexer pairs (A1-A2) and (B1-B2), which are placed at the same physical site, A and B respectively. In contrast, a "glass-through" node has no active network equipment and is used as a by-pass only.

Suppose the origin (O) and destination (D) nodes referred to an as an O-D node pair, are not located on the same ring. A provisioned path from "O" to "D" has to go through a number of rings referred to as a "ring sequence" (r). A valid ring sequence consists of rings listed in a sequential order, that is, each of the rings Ri and R(I+1) must have an ADM at the same POP and there are cross-office connections deployed between the two ADMS. Subsequent rings R(I−1) and R(I+2)must be physically interconnected in order to form a valid ring sequence (r). In the example of FIG. 3, a valid ring sequence is R1-R2-R3, or R4-R5. However, R1-R4, or R2-R4, are invalid ring sequences as there is no direct connectivity between rings.

The network topology information can be transformed into a simpler graph in terms of its inter-ring connectivity by applying a ring overlay transformation (ROT). The network topology information is then used to transform the ring overlay into a ring connectivity graph (RCG) 11, 19, where each node represents a ring in the network, and each connection between two nodes implies that the two rings are able to support an inter-ring connection configuration. RCG/1 shown at 11, reflects the single connectivity between the rings of the network 20. RCG/2 shown at 19, reflects the dual connectivity between the rings of the network 20. RCG/2 shows that there is no double connectivity between R1 and R5.

The method of path provisioning over ring-based networks will be now described with reference to FIGS. 4 to 9.

FIG. 4 illustrates a ring network topology including an O-D node pair [A-Z], and rings R1, R2, R4, R11, R12 between these nodes forming corresponding ring sequences between the origin node H" and the destination node "Z".

Figure 5:
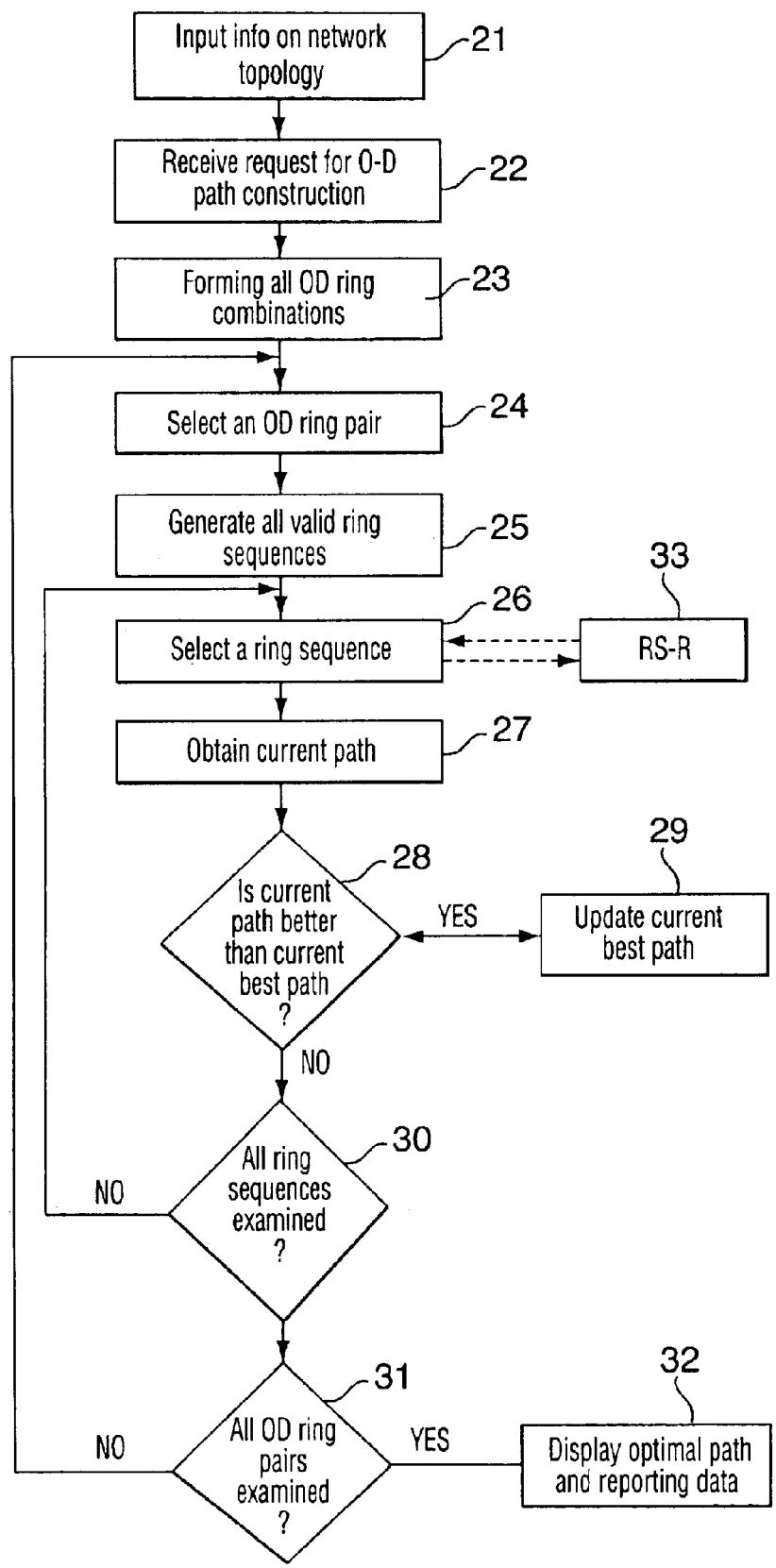
FIG. 5 is a flow chart illustrating the method for pa provisioning of the present invention.

FIG. 5 is a flow chart illustrating the method of path construction according to the invention To determine an end-to-end connection for the O-D node pair [A-Z] under consideration, the network topology information is provided at step 21. At step 22 a request for constructing a communications path between origin (A) and destination (Z) is received. The rings where the O-node and the D-node reside are identified as the "OD rings". All the OD rings combinations are inputted, step 23. At step 24 an OD ring pair R2-R11 in the example of FIG. 4, is selected. Node "A" resides on rings R1 and R2. Node "Z" resides on three rings R4, R11, R12. The product of these two values, i.e. f=2×3=6, is called the "OD rings multiplying factor" (ODMF) and reflect all possible OD ring pair combinations.

For the identified OD ring pair, a ring sequence (r) has to be specified for the path from "A" to "Z". Based on ring overlay transformation (ROT) all valid ring sequences are generated at step 25 and each ring sequence (r) is selected for end-to-end connection evaluation, step 26. For the example of FIG. 4, R2-R4-R11 is selected as the ring sequence (r).

Figure 6A:
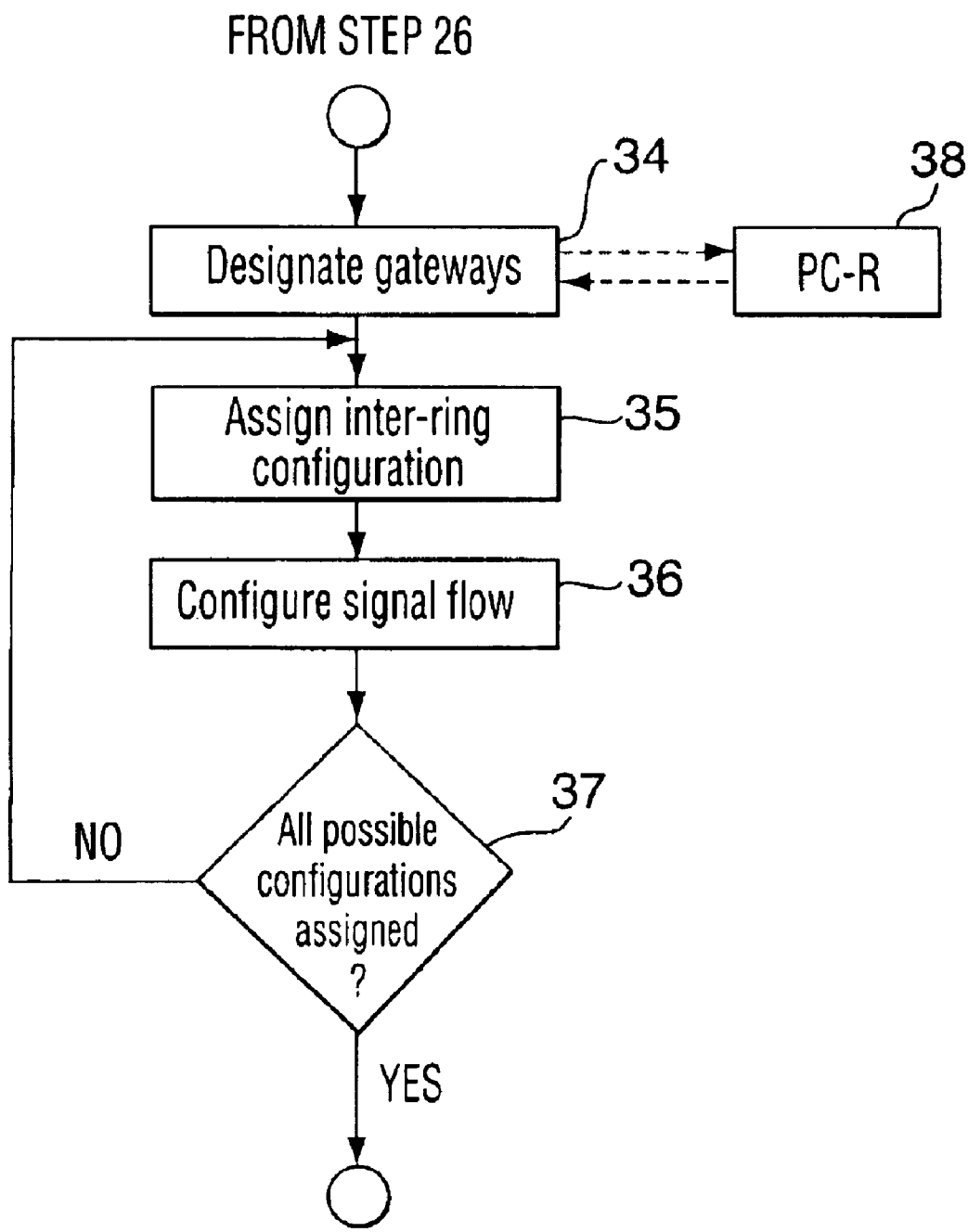
FIG. 6a is a flow chart illustrating the current path construction, or step 27 of FIG. 5.
Figure 7:
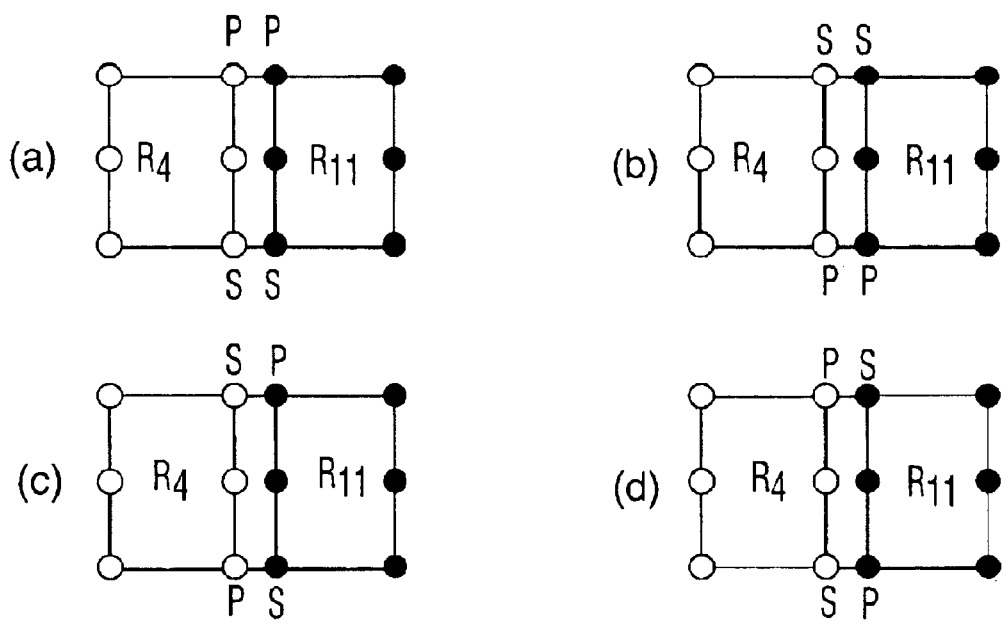
FIGS. 7a to 7d, illustrate possible matched nodes (MN) signal combinations between primary and secondary gateways.
Figure 8:
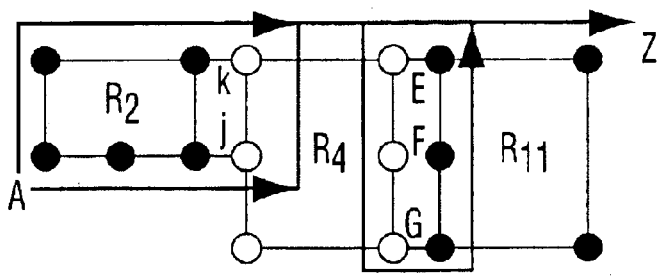
FIG. 8 is a graph illustrating the complete path construction from "A to "Z"

FIGS. 6a and 6b illustrate how the current path is calculated at step 27. Two gateways on each ring are designated and paired with corresponding gateways on adjacent ring, at stop 34.

FIG. 6b is a graph illustrating a partially completed communications path from "A" to "T" including the selected ring sequence R2-R4-R11 and the designated gateways. For the inter-ring connection site R2-R4, no decision needs to be made about which gateway pairs to use because there are only two available nodes "J" and "K" that are common to both R2 and R4. As discussed before, the term "node" in the gateway context denotes a connection node. Not all the nodes on a ring are connection nodes.

For the inter-ring connection site R4-R11, three common nodes "E", "F", "G", are available as gateways and therefore, three unique gateway combinations for nodes "E", "P", "G", are possible. These are combinations (3 choose 2), or V(3,2). For "k" gateways there are a number of (k choose 2) unique combinations to be considered, or V(k,2).

At each inter-ring connection site the connection configuration type, MN and/or DF is assigned, step 35 Suppose, a dual feeding (DF) connection configuration is chosen at the inter-ring connection site R2-R4 using nodes "K" and "J", and an MN inter-ring connection configuration at site R4-R11 using nodes "E" and "G". In addition, for the MN Inter-ring connection configuration, the signal flow in relevant rings has to be configured by indicating the primary (P) and secondary. (S) gateways, step 36. It is to be noted that, the path cost ĉ or the network unavailability (U) do not change dramatically when changing the gateways designation at the inter-ring connection site.

Four possible combinations of signal flow transfer between paired gateways, depending on how P and S are designated, are illustrated in FIGS. 7a to 7d. Suppose, the inter-ring connection configuration shown in FIG. 7a is assigned to the inter-ring connection site R4-R11. A complete path construction including the signal flow is obtained, step 27, and illustrated in FIG. 8. After assigning all possible DF and/or MN combinations, e.g. DF only, MN only, MN/DF combined, step 37, the process moves to stop 28.

The current path is now available for evaluation at step 28 and is compared with the current best path available from a database. The evaluation is based on an optimizing factor like the path cost ĉ or the network availability (U). The best current pass is automatically stored, step 29.

Steps 26 to 30 are repeated and the communications paths are obtained by performing successive calculations for each ring sequence corresponding to one OD ring pair, step 30. Steps 24 to 31 are performed for all OD ring pair combinations associated with the nodes "A" and "Z", step 31.

At step 32, an optimal communications path is found and an optimal path report is displayed. The optimal path report includes information regarding the connection configurations at the inter-ring sites, and the related reporting data like path cost (C), network unavailability (U), path optimization requirements, path searching strategy, elapsed time, the OD ring pair examined.

It is to be noted that the groups of steps 34-37, 26–30, and 24-31, are performed as an atomic transaction for each assigned inter-ring connection configuration, for each ring sequence corresponding to one OD ring pair, and for each OD ring pair combination, respectively.

"Atomic transaction" implies that a particular succession of steps are executed as an uninterrupted cycle. That is, during the execution of these steps, no subsequent request is admitted and the topology database can not be modified by an external process until the last step is completed.

The total number of communications paths for a particular O-D node pair in a BLSR network will be now calculated for combined MN and DF inter-ring connection configurations, in a ring sequence with "n" rings, since MN or DF are considered for each ring, there are $2^n$ combinations available.

As discussed before, there are V(k,2) gateways combinations at each inter-ring site and two gateways are needed for each inter-ring connection. For (n–1) inter-ring connection sites there will be $[V(k,2)]^{n-1}$ combinations.

For a dual feeding (DF) configuration, there is only one type of signal flow through a ring between primary (P) gateways and secondary (S) gateways. For an MN configuration, the signal may flow clockwise or counter-clockwise from the entry node to the exit node. For "n" rings, there will be $2^n$ different signal flow patterns. However, we assume that MN and DF are equally used along the communications path, and the "MN signal rating" is set to $2^n:2=2^{n-1}$.

The number of distinct communications paths between "O" and "D" nodes is given by the following path provisioning function:

$$N=2^n \times [V(k,2)]^{n-1} \times 2^{n-1} \times r \times f \tag{EQ1}$$

where:
"N" is the number of distinct communications paths between "O" and "D";
"n" is the (average) number of rings in a ring sequence;
"k" is the (average) number of common nodes, or gateways, on adjacent rings;
V(k,2) is the number of inter-ring paired gateway combinations;
"r" is the number of distinct ring sequences;
"f" is the OD rings multiplying factor (ODMF).

In a network of medium size, e.g. MCI (trademark) network, with an average ring sequence size n=8, average common nodes k=4, the number of distinct ring sequences r=40, and the ODMF being f=2, the number of distinct path constructions to be considered is 7.34e11, or $7.34 \times 10^{11}$.

The MN-only and DF-only configurations are special cases of the MN/DF combined configuration. For MN-only, the number of mixed MN/DF combinations ($2^n$) is not considered because DF is not used. The MN signal rating is changed to $2^n$ because all inter-ring connection are MN configurations. For DF-only, the mixed MN/DF combinations factor ($2^n$), and the MN signal diversity rating ($2^{n-1}$), are not considered at all.

Returning now to FIG. 5, for performing the exhaustive path provisioning method, each path is constructed and the related reporting data like path cost ĉ and network availability (U) are calculated. However, for calculating one communications path, the data manipulation and calculations are extensive and take a significant amount of time. About one microsecond of CPU time is used for calculating one communications path. The sample calculation of the above example with a total number of path constructions of 7.34×10¹¹ would require 7.34×10⁵ seconds, or 8.5 days. Each communications path associated with the O-D node pair under consideration, has to be examined and this operation requires a vast amount of time. Each network is unique in size, connectivity, topology, etc., and it is difficult to model a general equation to calculate an exact such value. On the other hand, a reliable estimate can be derived from the path provisioning function (EQ1) by examining the solution space for pruning opportunities to reduce the run-time while maintaining the quality solutions set almost intact.

The value of MN/DF combinations ($2^n$) is only 65,535 for an n=16 and therefore, reducing the number of MN/DF combinations is not considered.

Ring sequence (r) length is a major contributing factor because each extra ring introduces an extra inter-ring connection and this is lowering the network availability (U), and also requires at least four extra add/drop port cards and potentially more ADMs and this is increasing the path Cost (C). For small or medium sized networks, e.g. 5–12 rings, the number of ring sequences is not too large (r<100) and may not need reduction at all. For large networks, or networks with high ring connectivity, the number of ring sequences may be in the range of tens of thousands for one O-D node pair.

A ring sequence reduction (RS-R), step 33 in FIG. 5, uses a maximum ring sequence limit set at around 5–10% of rings above the number of the rings in the shortest ring sequence (r/s). Any ring sequence that is more than 10% longer than H=r/s+2 in terms of hops, can be excluded as the ring sequence size has an impact on the amount of equipment deployed, which is in turn directly related to both cost ĉ and availability (U). Any larger size ring sequence (r) will not be evaluated as the ring sequence limit set at "H" encapsulates all quality solutions.

A path construction reduction (PC-R), step 38 in FIG. 6a, is a method for performing run-time optimization at the inter-ring connection sites where the choice of the gateways on a ring, as well as how these gateways are paired with corresponding gateways on adjacent ring is considered.

The total number "N" of communications paths between "O" and "D" can be reduced by eliminating the longer paths and retaining the "h" shortest paths. To determine these h-shortest paths implies to generate all possible paths from source (O) to destination (D) and list all of them from shortest to longest. If the complete set containing all O-D paths generated by the exhaustive path provisioning method is considered, the required storage facilities would be enormous and therefore, the h-shortest path algorithm becomes impractical as far as the run-time is concerned for very large "N's". In addition, a significant number of ring sequences may be excessively routed and the calculated path may take an unnecessarily long route.

Figure 1B:
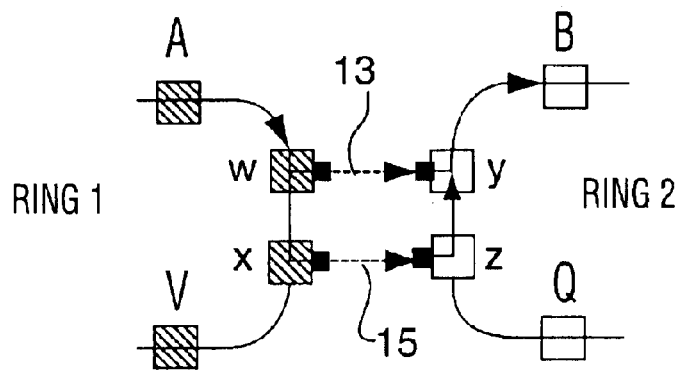
Figure 1C:
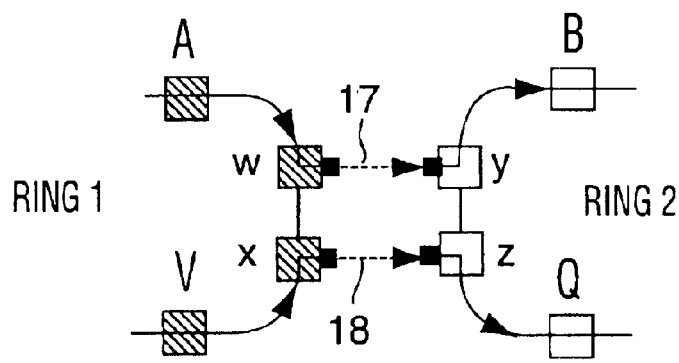

For a DF-DF sequence configuration (see FIG. 1c), using the outer-most gateways will result in better network availability (U) and lower path cost ĉ because less equipment is used, as also shown in Table 1, page 8. For an MN-MN sequence configuration, (see FIG. 1b), the closest primary (P) gateways will be selected and the gateways which are closest to "P" will be designated as the secondary (S) gateways, as also shown in Table 1, page 8.

Figure 9A:
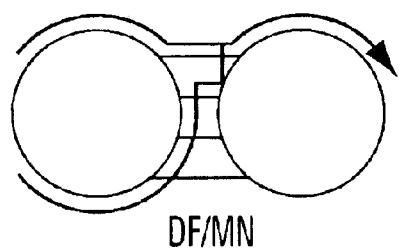
FIGS. 9a and 9b illustrate a path construction reduction (PC-R) method for DF/MN assignments.
Figure 9B:
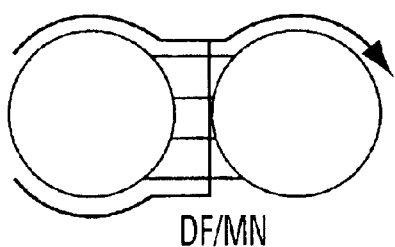

For a DF-MN sequence, FIGS. 9a and 9b, widely separated gateways are used, called also wide entry/egress, to improve DF ring availability, without increasing the amount of the equipment deployed. The configuration of FIG. 9b provides for a higher availability (U).

It is to be noted that, the path cost ĉ and network unavailability (U) for DF-only is much lower compared to MN-only and therefore, DF-only can cost less and have lower unavailability (U) than MN-only due to the reduced amount of fiber used by the DF-only configuration.

Figure 2A:
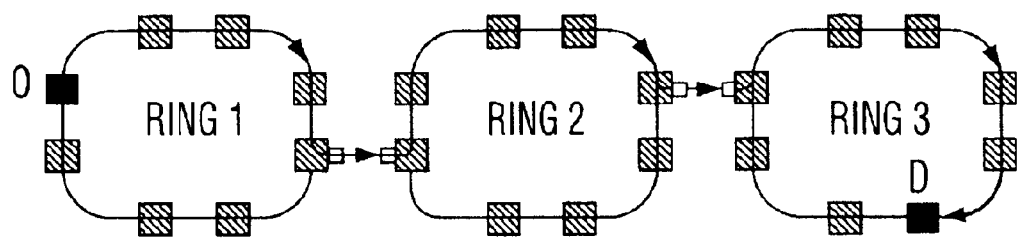
FIG. 2a illustrates the signal flow for a single feeding (SF) configuration.
Figure 2B:
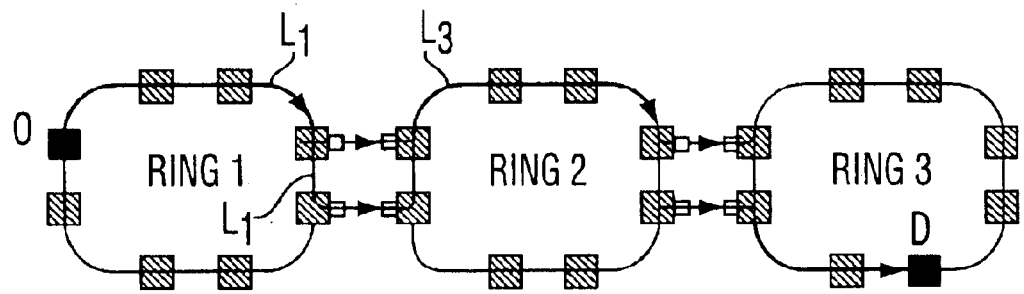
FIG. 2b illustrates the signal flow for a matched nodes (MN) configuration.
Figure 2C:
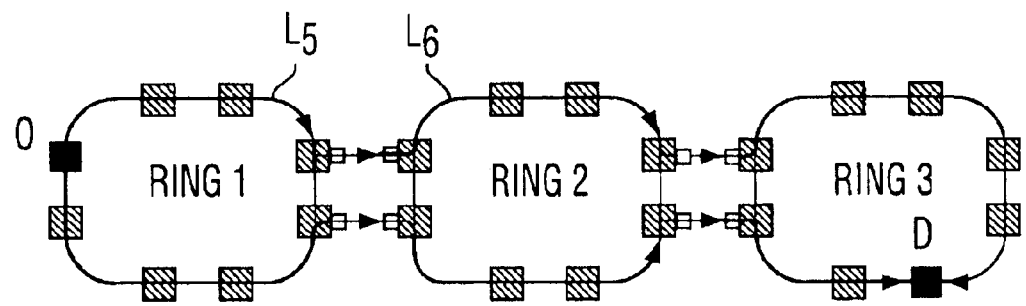
FIG. 2c illustrates the signal flow for a dual feeding (DF) configuration.

Returning to FIGS. 2b and 2c, it can be seen that MN-only uses three spans L1, L2, L3, while DF-only uses two spans L4, L5. When the span length is significant the span-to-span failure is dominant and unavailability (U) is worsening for MN-only connection configuration.

The use of MN/DF combined path can result in better path cost a and/or network availability (U). The MN-only path does not always provide the lowest unavailability (U) compared to DF-only or MN/DF combined.

A dominant factor of the EQ1 is the number of gateway combinations V(k,2) which dramatically increases as the number of gateways (k) increases High numbers of common nodes, e.g. k≧4, between two rings are rare. By using the outermost gateways for the DF configuration and the closest P and S gateways for MN configuration, the number of gateways can be designated as k=2 and A(k/2) essentially reduced to "1". When using the PCR reduction, the path provisioning function uses equation:

$$N=2^n \times 1 \times 2^{n-1} \times r \times f \quad (EQ2)$$

By combining RS-R and PC-R reductions, the run-time is reduced even further while the quality solutions set remains the same as In the PC-R reduction. The following equation calculates the number of possible communications paths for an OD node pair over a ring-based network if both RS-R and PC-R (PC/RS-R) reductions are used to improve the run-time:

$$N=2^n \times 1 \times 2^{n-1} \times H \times f \quad (EQ3)$$

where H≦r/s+2.

Figure 15A:
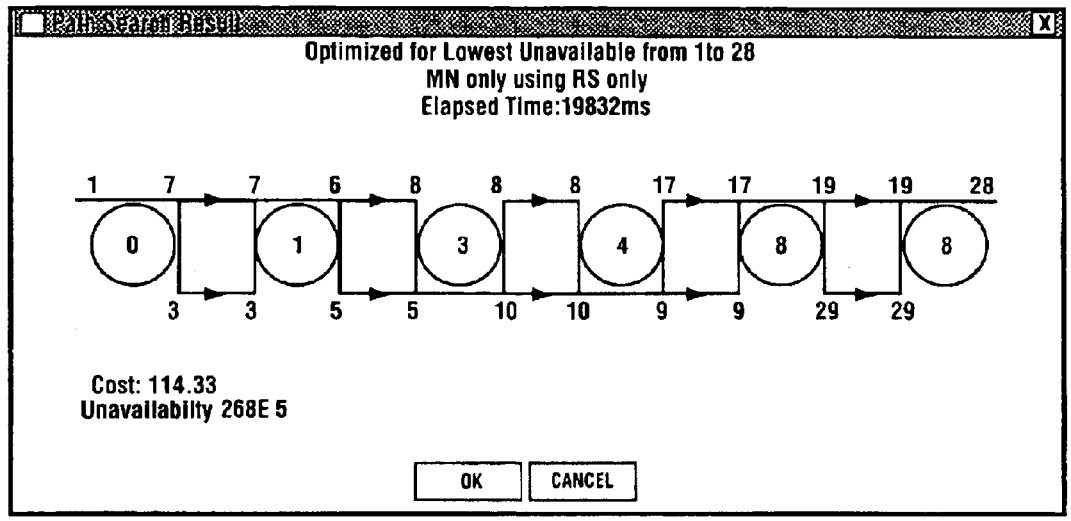
FIG. 15a illustrates an MN-only path optimized for min-U.
Figure 15B:
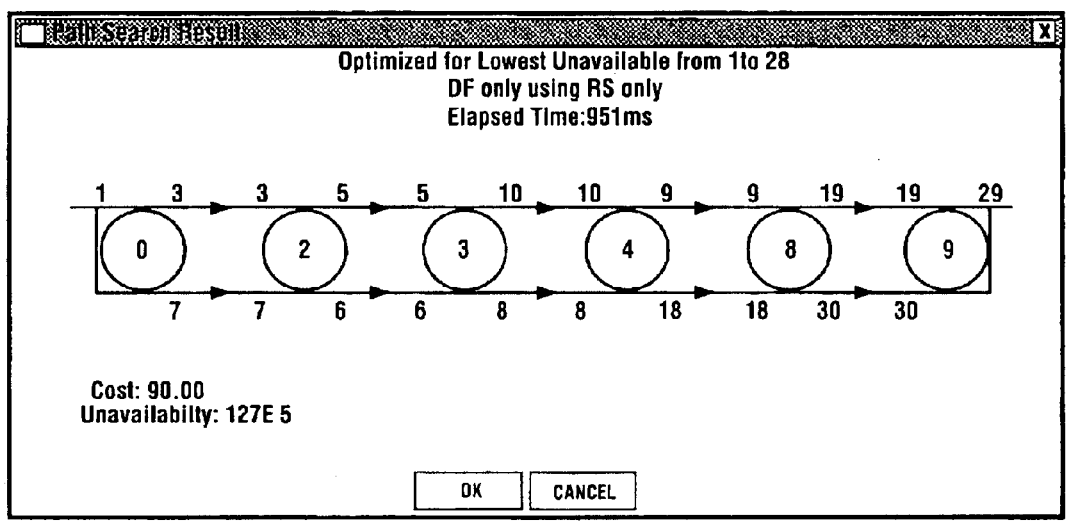
FIG. 15b illustrates an DF-only path optimized for min-U.

The ring sequence reduction (RS-R) can be used to replace the exhaustive method because exhaustive run-time is too long. The accuracy of the ring sequence reduction (RS-R) is extremely good. The optimal communications paths in FIGS. 15a and 15b use RS-R only to reduce the run-time to a practical interval. In most of the cases, RS-R only is used to construct the optimal path.

All the results using RS-R path design are the same as the optimal path as the RS-R reduction eliminates the long ring sequences which are unlikely to contain a lower cost construction as they comprise excessive hops, and evaluates every feasible communications path for the examined OD node pair. It can be seen that the ring sequence limit set at (r/s+2) is sufficient to preserve the quality solution set, including the optimal path. It is concluded that, as far as path cost is concerned, the RS-R eliminates the non-optimal solutions only. It is evident that RS-R does not affect the path cost ĉ either.

It is to be noted that, the RS/PCR path provisioning method can be always completed within a practical amount of time, even for very long communications paths and without eliminating the quality solutions It is evident that the RS-R optimization method does not eliminate any quality solution, whereas the PCR optimization method may improve the run-time at the expense of the number of examined communications paths.

A software application, OPTICA (Optimizing Path Provisioning Tool Integrating Cost and Availability), has been developed and implemented in a computer program product tangibly embodied in a machine-readable storage device for execution by a programmable processor executing a program of instructions operating on input data and generating output data.

Figure 10:
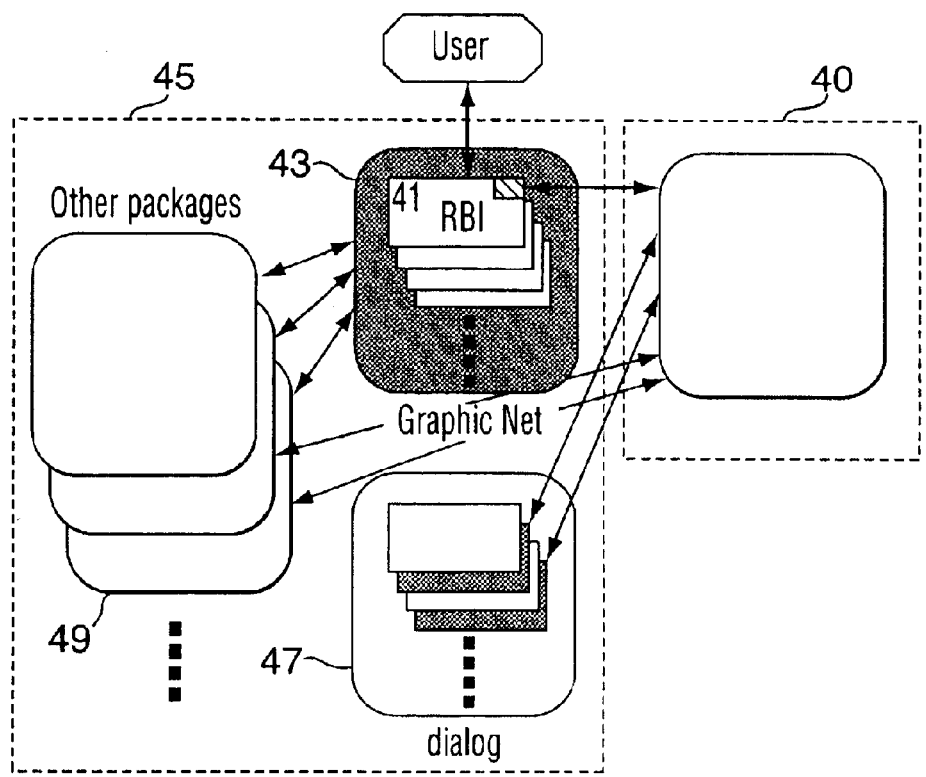
FIG. 10 is the architecture overview of the RBI and OPTICA packages.

FIG. 10 shows the overall architecture in terms of the interaction between a Ring Builder Interactive (RBI) block 45 and the path provisioning tool OPTICA 40. A "class" is a source file that embeds an objects description, i.e. its data structure and related operations. A "package" is a group of "class" files from the same domain that are logically related. For example, the "GraphicNet" package 43 contains all the classes that are used to display and control the main graphical network representation and the main window of the application. The "dialog" package 47 contains all the pop-up sub-windows and dialog boxes in the application.

RBI 45 is a tool for automating ring network design, which was developed by the Network Systems Group at the Canadian TRLabs. (Telecommunications Research Laboratories), Edmonton, Alberta. RBI 45 was developed under Windows NT 4.0 and uses Java 1.2. Although Java is claimed to be platform independent, the use of Windows NT 4.0 in developing OPTICA 40 is more consistent with RBI 45 implementation.

By implementing OPTICA 40, the main application class RBI 45 in the GraphicNet package 43 is redesigned so that the path provisioning option is available in the menu bar of the main RingBuilder window. All other operations are performed in the OPTICA package 40. Other packages 49 may be available if required.

Figure 11:
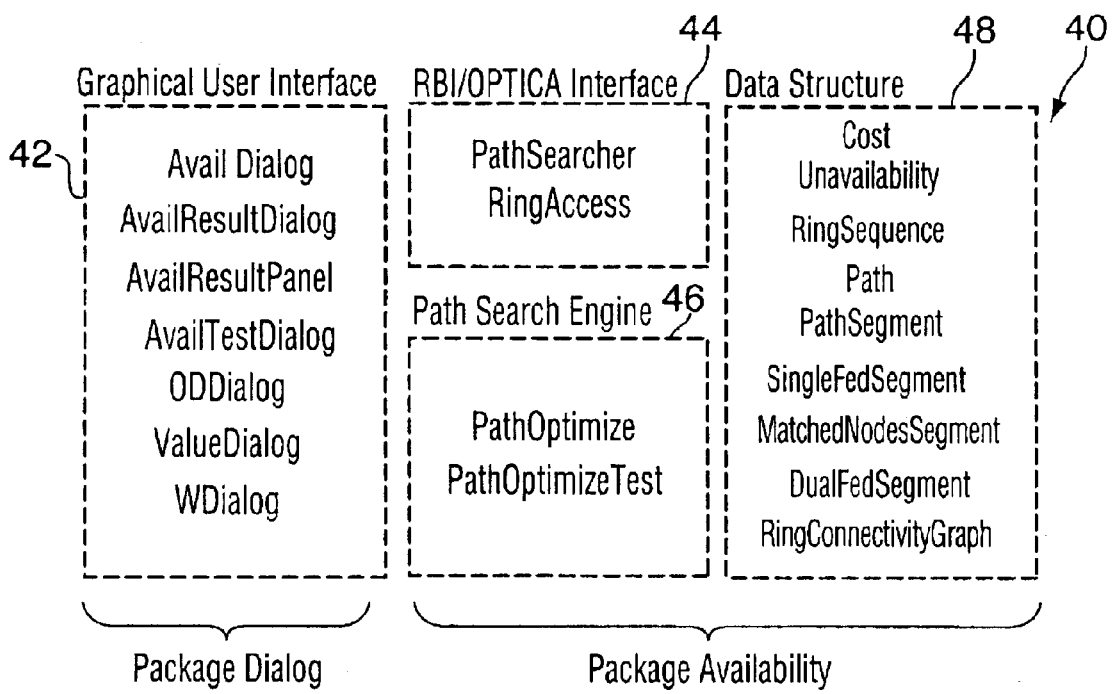
FIG. 11 illustrates the classes introduced in the OPTICA package.

The newly-defined data structures for performing the path provisioning tool operations are placed inside the OPTICA package 40. The major classes being Introduced are listed in FIG. 11. The dotted lines delineate classes with similar functions.

The GUI (graphic user interface) classes 42 are responsible for receiving input, issuing warnings, and displaying results. The RBI/OPTICA interface 44 is the link between RBI 45 and OPTICA 40. The path search engine 46 is the core of the path searching strategies. The data structure group 48 contains the main structures that enable path construction and provisioning.

Figure 12:
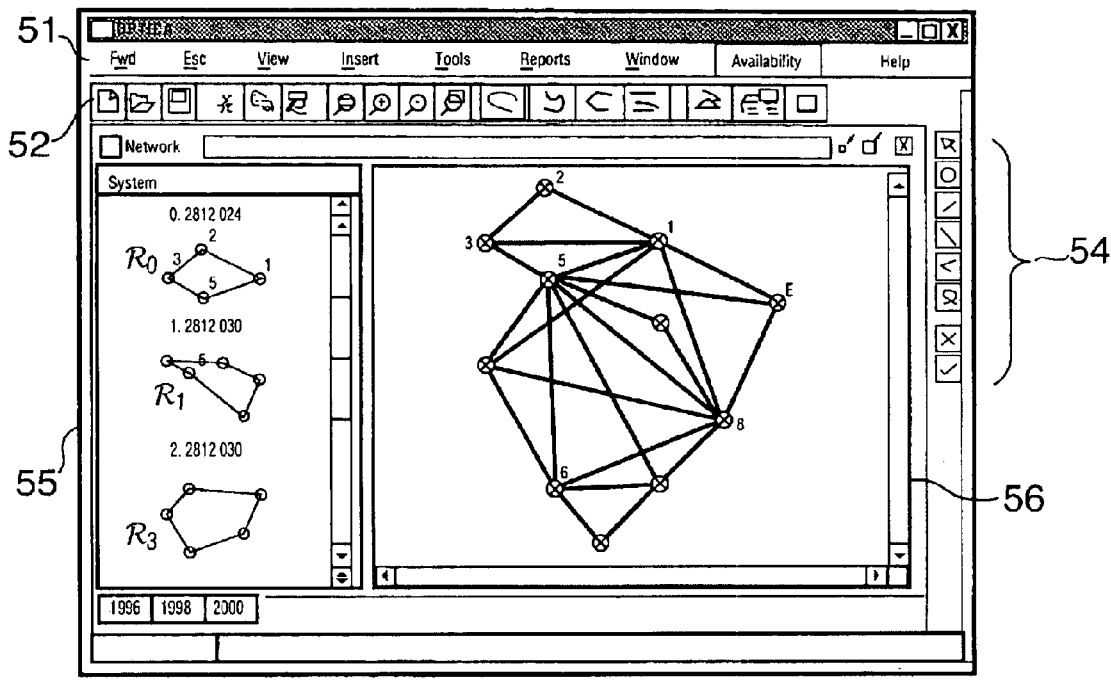
FIG. 12 illustrates the main window of the OPTICA path provisioning tool.

FIG. 12 illustrates the main OPTICA window after opening an existing network file with the ring overlay set.

Area 51 indicates the menu bar, which includes all the function selections of RBI 45 and OPTICA 40. The buttons in area 52 are basically a subset of the functions in area 61. Area 63 indicates the "Availability" option, which is the link from RBI 45 to OPTICA 40 functions. Area 54 is the list of basic functions that allow the user to graphically manipulate, i.e. create, modify, delete, the network topology. Area 55 displays the existing rings R0-R1-R3 connecting node-2 and node-10, and area 56 displays the current network graph including 11 nodes. Areas 56 and 56 together form a design window which encompasses all the data for the current network design. A network can be designed using tools from area 64, and importing data from a text file of the network topology in a TRLabs standard network interface format (SNIF).

Figure 13:
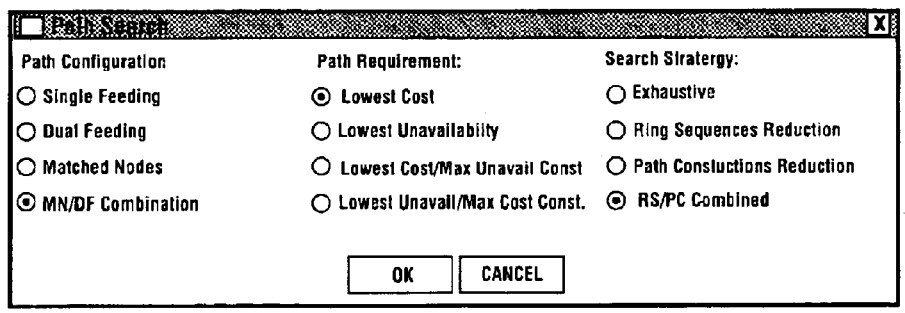
FIG. 13 is a picture of the path search requirement dialog box.

A "Path Search" function can search for an end-to-end communications path with specific requirements in terms of path cost ĉ and availability (U). An "Estimate Run Time" function requires input similar to that of the "Path Search" function, i.e. the O-D node pair [2-10]. The O-D node pair has to be inputted in a selection list including their corresponding O-D node names. First, "Availability" is selected from the menu bar, then "Path Search". A dialog box, shown in FIG. 13, illustrates the path search window used to input a path inter-ring connection configuration, e.g. MN/DF combined, a path optimization factor, e.g. lowest cost, and a path searching strategy, e.g. exhaustive.

Figure 14:
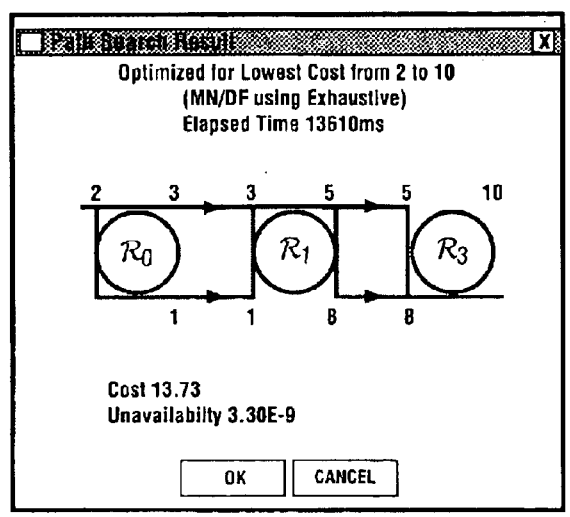
FIG. 14 is a path search result display window.

The search engine is then executed to search for the optimal communications path which best satisfies the required service level agreement (SLA). The optimal path is reported in the format shown in FIG. 14. The report displays an abstraction of the resulting path design in a simplified view showing the optimal ring sequence between nodes 2 and 10, the designated gateways, and the assigned MN/DF inter-ring connections configurations. R0 contains the origin node-2. R0 interfaces to R1 at node-3 and node-1. The MN signal takes the shortest route between node-3 to node-5 in R1. Then R1 interfaces to R3 at node-5 and node-8. The signal then takes the shortest route from node 8 to node 10, which is the destination (D) node. This is a fully provisioned end-to-end path, originating from node-2 and terminating at destination (D) node-10. All the inter-ring connection information is displayed, as well as reporting data like the path cost (C), unavailability (U), search strategy, optimization requirements, and the elapsed time of the search.

For a better understanding of the path provisioning method and apparatus of the invention, three networks N1, N2, N3, are chosen as follows: a small size network as network N1, a medium size network as network N2, and a large size network as network N3. Network N1 is basically a metropolitan network with a small number of nodes, spans and rings, and also a small average span length. N2 and N3 are long-haul networks with longer span distances.

The ring overlay sets are manually configured, to provide total coverage of the network topology. Rings are placed in a logical and planar fashion to simply cover the network area, using an average ring connectivity between 2.0 and 2.4 for this example.

TABLE 2

|  | Network | | | Network | | | Network | | |
| --- | --- | --- | --- | --- | --- | --- | --- | --- | --- |
|  | Total Ring Sequences | Shortest Ring Sequence | O-D Rings Multiplying Factor | Total Ring Sequences | Shortest Ring Sequence | O-D Rings Multiplying Factor | Total Ring Sequences | Shortest Ring Sequence | O-D Rings Multiplying Factor |
| ODS1 | 5 | 2 | 2 | 19 | 2 | 2 | 25900 | 3 | 1 |
| ODS2 | 20 | 2 | 4 | 54 | 2 | 4 | 49154 | 3 | 2 |
| ODS3 | 10 | 2 | 2 | 7 | 2 | 1 | 37037 | 3 | 2 |
| ODM1 | 10 | 3 | 2 | 28 | 3 | 2 | 91612 | 4 | 2 |
| ODM2 | 15 | 3 | 3 | 67 | 3 | 4 | 14082 | 5 | 1 |
| ODM3 | 10 | 2 | 1 | 88 | 4 | 4 | 91388 | 4 | 1 |
| ODL1 | 5 | 3 | 1 | 90 | 6 | 2 | 45393 | 6 | 1 |
| ODL2 | 5 | 3 | 1 | 222 | 4 | 6 | 170756 | 7 | 1 |
| ODL3 | 5 | 3 | 1 | 129 | 4 | 4 | 139386 | 7 | 2 |

Each network contains nine O-D node pairs classified into three categories: short (ODS), medium (ODM), and long (ODL), with three O-D node pairs in each category. Thus, each network N1, N2, and N3, contains nine different origin-destination node pairs (O-D node pairs) as listed in Table 2.

Table 2 shows how many distinct ring sequences can be chosen as communications paths between each O-D node pair. It is understood that, ODS1 to ODL3 in N1, are different from the ODS1 to ODL3 in N2, and also from N3. The "Shortest Ring Sequence" column shows the number of hops included in the shortest possible ring sequence for the examined O-D pair. For example, in ODS1 in N1, the origin node (O) is two rings, i.e. 1 hop, away from the destination node (D) The data on the "Shortest Ring Sequence" column is obtained by applying the h-shortest paths algorithm on the corresponding RCG.

Using the data from Table 2, calculations can be performed to estimate the number of all possible path constructions for each O-D node pair, using EQ1. The estimate is not calculated based on the uniqueness of the rings, nor on the available gateways at each inter-ring connection site.

Customers may have various preferences on both cost and availability as their optimization objective. For example, a customer may request a path with minimal unavailability (U) within a specific budget Therefore, a path provisioning tool should deploy various strategies in absolute and constrained searches to determine the optimal communications path.

A dual failure analysis calculates the network unavailability (U) by summing up all the dual-equipment failure causing outages. It is to be noted that, single equipment failure is not accounted for as this failure will not cause outages. Moreover, triple or quadruple equipment failure is also not considered because its contribution to unavailability (U) is considered insignificant, e.g. $10^{-12}$ or less.

Network planners may have a strict preference for one objective, i.e. path cost (C), whereas they may have only a concern that the other objective, i.e. network availability (U), be below or above an acceptable limit For example, when provisioning a path over a ring-based network, two situations are of interest: (1) minimizing cost subject to a maximum unavailability constraint (minC/maxU); or (2) minimizing unavailability subject to a maximum cost constraint (minU/maxC).

Figure 16:
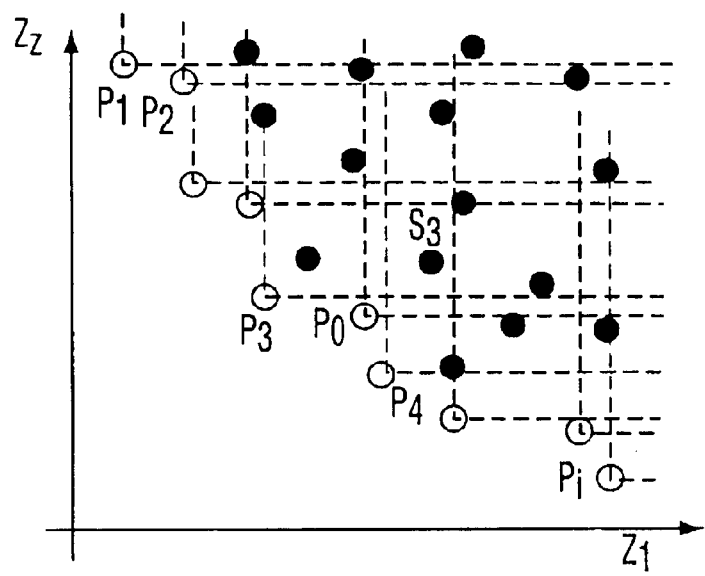
FIG. 16 illustrates a Pareto solution set.

A bi-objective optimization process includes two objective functions, Z1 and Z2 as shown in FIG. 16. A solution point of the bi-objective optimization function, eg. point Po, implies that improving Objective-1 will result in a degradation of Objective-2. If both functions Z1 and Z2 are minimized, then each point PO,P1, . . . Pi, define a discrete Pareto solution set Suppose a search for the shortest path in a network with two objectives, e.g. path cost ĉ and network unavailability (U), results in a Pareto solution point Po. To further minimize on function Z1, solution point P3 may be used having a lower Z1 value but a higher 72 value. As for further minimizing on function Z2 solution point P4 may be used having a lower Z2 value but a higher Z1 value.

Most techniques used for solving a bi-objective, or multiple objective functions based on shortest path methods focus on generating the set of efficient communications paths, then select one configuration depending on the SLA requirements.

TABLE 3

| | Cost Constraint | Actual Unavailability | Actual Cost |
|---|---|---|---|
| 1 | 0% | 333.1667 | 5.02E−06 | 299.09999 |
| 2 | 5% | 324.285 | 5.02E−06 | 299.09999 |
| 3 | 10% | 315.4033 | 5.02E−06 | 299.09899 |
| 4 | 15% | 306.5217 | 5.02E−06 | 299.09999 |
| 5 | 20% | 297.64 | 5.04E−06 | 248.73333 |
| 6 | 25% | 288.7583 | 5.04E−06 | 248.73333 |
| 7 | 30% | 279.8767 | 5.04E−06 | 248.73333 |
| 8 | 35% | 270.995 | 5.04E−06 | 248.73333 |
| 9 | 40% | 282.1133 | 5.04E−06 | 248.73333 |
| 10 | 45% | 253.2317 | 5.04E−06 | 248.73333 |
| 11 | 50% | 244.35 | 6.18E−06 | 229.29999 |
| 12 | 55% | 235.4683 | 6.18E−06 | 229.29999 |
| 13 | 60% | 226.5867 | 8.78E−06 | 205.89999 |
| 14 | 65% | 217.705 | 8.78E−06 | 205.89999 |
| 15 | 70% | 206.8233 | 8.76E−06 | 205.89999 |
| 16 | 75% | 199.9417 | 8.80E−06 | 155.53333 |
| 17 | 80% | 191.06 | 8.80E−06 | 155.53333 |
| 18 | 85% | 182.1783 | 8.80E−06 | 155.53333 |
| 19 | 90% | 173.2967 | 8.80E−06 | 155.53333 |
| 20 | 95% | 164.415 | 8.80E−06 | 155.53333 |
| 21 | 100% | 155.5333 | 8.80E−06 | 155.53333 |

Table 3 comprises the records of the approximated Pareto solution set for ODS-1 in N3. First, U is minimized (minU) and the related path cost (CminU) calculated. Secondly, the path cost ĉ is minimized (minC) and the related availability (UminC) is calculated. The difference (CminU−UminC) is divided by 20 to find an incremental value of 5% in this example, as reflected in the Cost Constraint column of Table 3. The Cost Constraint column, the unavailability (U) and the path cost ĉ are calculated using OPTICA.

Figure 17A:
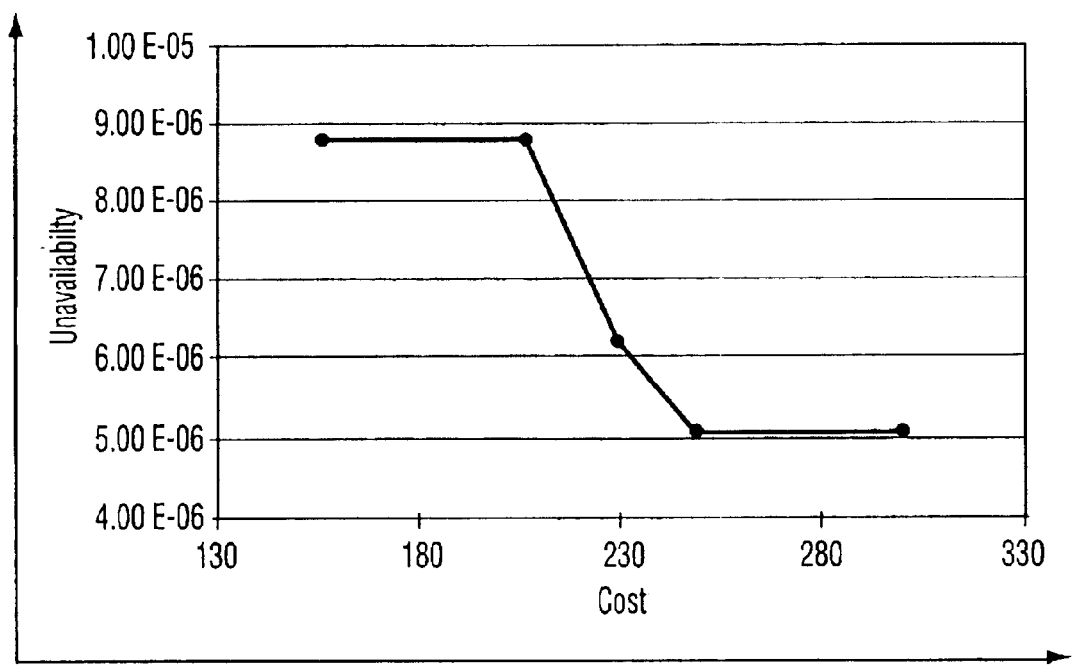
FIGS. 17a, 17b, 17c, illustrate Pareto solution sets for short medium and long O-D span lengths, respectively.
Figure 17B:
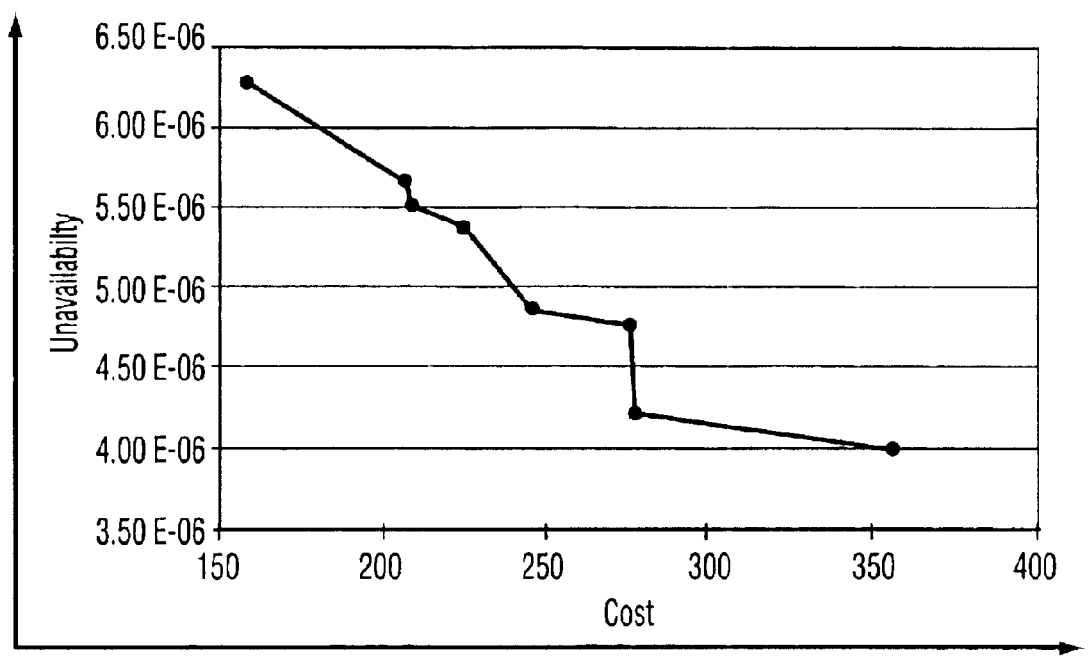
Figure 17C:
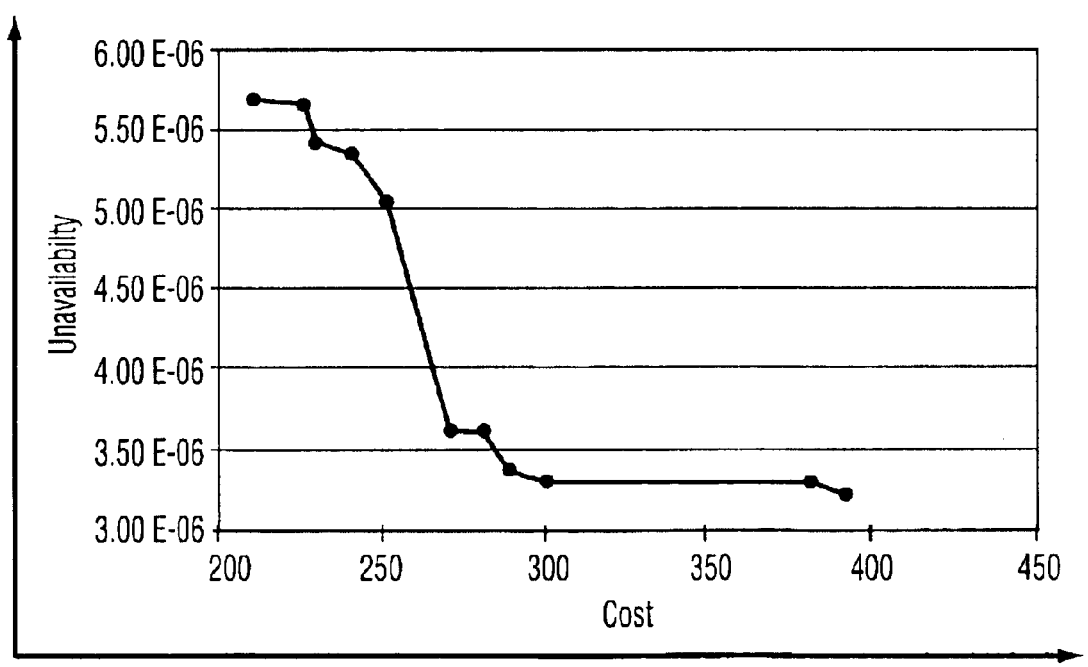

FIG. 17a illustrates the unavailability (U) and the cost coordinates representing the approximated Pareto solutions set curve for ODS-1 in Network N3. Similarly, FIGS. 17b and 17c illustrate the Pareto solutions set for ODM1 and ODL1, respectively, in N3.

Using the single objective with a constraint optimization method, or by directly reading the Pareto curve, an optimal Communications path with assured availability and minimum path cost ĉ can be selected. The Pareto curve is very useful for the network planner in analysing the path provisioning problem because the curve presents all the suitable options, and the planner can make a more informed decision based on customer's requirements.

For example, in attempting to minimize the unavailability (U) for ODS1 in N3, the resulting path using single objective minimization is $5.02 \times 10^{-6}$ in unavailability (U), with 299.0999 as cost (see line 4, Table 3). However, If a 0.3984% increase in unavailability ($U=5.04 \times 10^{-6}$) is acceptable, then a reduction amounting to 16.84% of the path cost (C=248.7333) is obtained as shown on line 5, Table 3. In this case, a slight relaxation in unavailability (U) contributes to a major cost reduction and is due to the use of different ring sequences.

The path provisioning method of the invention generates optimal solutions for single objective (minC, minU), and single objective with a constraint (minC/,maxU, or (minU/maxC) path provisioning optimization functions in order to match the service level agreement (SLA) requirements. Significant improvement on run-time, when compared to the exhaustive approach, is obtained using ring sequence reduction (RS-R) and/or path construction reduction (PC-R). In addition the path provisioning tool OPTICA embodying the present method, can rapidly and accurately generate be optimal communications path, the reporting data, and the Pareto solutions set.

Numerous modifications, adaptations, and variations may be made to the particular embodiments of the invention without departing from the scope of the invention which is defined in the claims.

What is claimed is:

1. A method for provisioning a communications path between an origin node (O) and a destination node (D) in a bi-directional line switched ring (BLSR) network, said O and D nodes residing in a plurality of OD ring pairs, said method comprising the steps of:
   a) selecting an OD ring pair from said plurality of OD ring pairs;
   b) selecting a ring sequence from a plurality of valid ring sequences corresponding to said selected OD ring pair;
   c) calculating a current path associated with said selected ring sequence;
   d) comparing, based on an optimization factor, said current path with a current best path available from a database and continuously updating said database with the best current path;
   e) repeating steps (c) and (d) for each inter-ring connection configuration until a first communications path is obtained:
   f) repeating steps (b) to (e) for each said ring sequence of said plurality of ring sequences until a second communications path is obtained; and
   g) repeating steps (a) to (f for each said OD ring pair until an optimal path is found.

2. The method of claim 1, wherein said step of calculating a current path comprising the following steps performed as an atomic transaction:
   designating paired gateways at each inter-ring connection site;
   assigning said inter-ring connection configuration for said paired gateways; and
   configuring the signal flow at said inter-ring connection site.

3. The method of claim 1, wherein steps (b) to (e) are performed as an atomic transaction.

4. The method of claim 1, wherein steps (a) to (f) are performed as an atomic transaction.

5. The method of claim 1, further comprising the step of displaying said optimal path and path reporting data.

6. The method of claim 1, wherein said inter-ring connection configuration is selected from the group consisting of dual feeding (DF) only, matched nodes (MN) only, and MN/DF combined configuration.

7. The method of claim 6, wherein the number of paths between said origin (O) and destination (D) nodes is calculated with the equation:

$$N=2^n \times [V(k,2)]^{n-1} \times 2^{n-1} \times r \times f$$

where:
   "N" is the number of distinct communications paths between "O" and "D";
   "n" is the averaged number of rings in a ring sequence;
   "k" is the averaged number of gateways;
   $V(k,2)$ is the number of inter-ring paired gateway arrangements;
   "r" is the number of distinct ring sequences;
   "f" is the OD rings multiplying factor.

8. The method of claim 7, wherein $r \leq r/s+2$ where r/s is the number of rings included in the shortest path.

9. The method of claim 7, wherein the number of said gateways is k=2, the outermost gateways are used for said DF configuration, primary gateways are chosen closer to the secondary gateways for said MN configuration, and widely separated gateways are used for said MN/DF combined configuration.

10. The method of claim 7, wherein $r \leq r/s2$ where r/s is the number of nodes included in the shortest path, the number of said paired gateways is k=2, the outermost gateways are used for said DF configuration, primary gateways are chosen closer to the secondary gateways for said MN configuration, and widely separated gateways are used for said MN/DF combined configuration.

11. The method of claim 1, wherein said optimization factor is a minimum path cost (minC).

12. The method of claim 1, wherein said optimization factor is a minimum network unavailability (minU).

13. The method of claim 1, wherein said optimization factor is a minimum path cost corresponding to a maximum network unavailability (minC/maxU).

14. The method of claim 1, wherein said optimization factor is a minimum network unavailability corresponding to a maximum path cost (minU/maxC).

15. The method of claim 1, wherein said optimization factor is used to calculate a Pareto curve for said BLSR network.

16. A computer-readable medium containing computer executable instructions for efficiently provisioning a communications path between an origin node (O) and a destination node (D) in a bi-directional line switched ring (BLSR) network, said O and D nodes residing in a plurality of OD ring pairs, said computer-readable medium performing the steps of:
   a) selecting an OD ring pair from said plurality of OD ring pairs;
   b) selecting a ring sequence from a plurality of valid ring sequences corresponding to said selected OD ring pair;
   c) calculating a current path associated with said selected ring sequence;
   d) comparing, based on an optimization factor, said current path with a current best path available from a database and continuously updating said database with the best current path;
   e) repeating steps (c) and (d) for each inter-ring connection configuration until a first communications path is obtained;
   f) repeating steps (b) to (e) for each said ring sequence of said plurality of ring sequences until a second communications path is obtained; and
   g) repeating steps (a) to (f) for each said OD ring pair until an optimal path is found.

17. The computer-readable medium of claim 16, wherein said step of calculating a current path comprising the following steps performed as an atomic transaction:
   designating paired gateways at each inter-ring connection site;
   assigning said inter-ring connection configuration for said paired gateways; and
   configuring the signal flow at said inter-ring connection site.

18. The computer-readable medium of claim 16, wherein steps (b) to (e) are performed as an atomic transaction.

19. The computer-readable medium of claim 16, wherein steps (a) to (f) are performed as an atomic transaction.

20. The computer-readable medium of claim 16, further comprising the step of displaying said optimal path and path reporting data.

21. The computer-readable medium of claim 16, wherein said connection configuration is selected from the group consisting of dual feeding (DF) only, matched nodes (MN) only, and MN/DF combined configuration.

22. The computer-readable medium of claim 21, wherein the number of paths between said origin (O) and destination (D) nodes is calculated with the equation:

$$N=2^n \times [V(k,2)]^{n-1} \times 2^{n-1} \times r \times f$$

where:
"N" is the number of distinct communications paths between "O" and "D";
"n" is the averaged number of rings in a ring sequence;
"k" is the averaged number of gateways;
V(k,2) is the number of inter-ring paired gateway arrangements;
"r" is the number of distinct ring sequences;
"f" is the OD rings multiplying factor.

23. The computer-readable medium of claim 22, wherein $r \leq r/s+2$ where r/s is the number of rings included in the shortest path.

24. The computer-readable medium of claim 22, wherein the number of said gateways is k=2, the outermost gateways are used for said DF configuration, primary gateways are chosen closer to the secondary gateways for said MN configuration, and widely separated gateways are used for said MN/DF combined configuration.

25. The computer-readable medium of claim 22, wherein $r \leq r/s+2$ where r/s is the number of nodes included in the shortest path, the number of said paired gateways is k=2, the outermost gateways are used for said DF configuration, primary gateways are chosen closer to the secondary gateways for said MN configuration, and widely separated gateways are used for said MN/DF combined configuration.

26. The computer-readable medium of claim 16, wherein said optimization factor is a minimum path cost (minC).

27. The computer-readable medium of claim 16, wherein said optimization factor is a minimum network unavailability (minU).

28. The computer-readable medium of claim 16, wherein said optimization factor is a minimum path cost corresponding to a maximum network unavailability (minC/maxU).

29. The computer-readable medium of claim 16, wherein said optimization factor is a minimum network unavailability corresponding to a maximum path cost (minU/maxC).

30. The computer-readable medium of claim 16, wherein said optimization factor is used to calculate a Pareto curve for said BLSR network.

31. An apparatus for provisioning a communications path between an origin node (O) and a destination node (D) in a bi-directional line switched ring (BLSR) network, said O and D nodes residing in a plurality of OD ring pairs, said apparatus comprising:

means for inputting a path provisioning request including an OD ring pair selected from said plurality of OD ring pairs, a path searching strategy, an optimization factor, and an inter-ring connection configuration;

means for generating all valid ring sequences corresponding to said OD ring pair;

means for calculating a current path associated with a ring sequence selected from said plurality of valid ring sequences, and repeating the calculation for each said inter-ring connection configuration, each said ring sequence, and each said OD ring pair;

means for comparing, based on said optimization factor, said current path with a current best path available from a database and continuously updating said database with the best current path until an optimal path is found; and means for displaying said optimal path and path report data.

32. The apparatus of claim 31, wherein said means for calculating a current path comprising:

means for designating paired gateways at each inter-ring connection site;

means for assigning said inter-ring connection configuration for said paired gateways; and means for configuring the signal flow at said inter-ring connection site.

33. The apparatus of claim 31, wherein said optimal path comprising an optimal ring sequence between nodes O and D, designated gateways, and optimal inter-ring connection configuration.

34. The apparatus of claim 31, wherein said path reporting data comprising an O-D node pair, a path cost ĉ value, a network unavailability (U) value, a selected path searching strategy, a selected optimization factor, a period of elapsed time.

35. The apparatus of claim 31, wherein said inter-ring connection configuration is selected from the group consisting of dual feeding (DF) only, matched nodes (MN) only, and MN/DF combined configuration.

36. The apparatus of claim 31, wherein said path searching strategy includes ring sequence reduction (RS-R).

37. The apparatus of claim 31, wherein said path searching strategy includes path construction reduction (PC-R).

38. The apparatus of claim 31, wherein said path searching strategy includes ring sequence and path construction reduction (PC/RS-R).

39. The apparatus of claim 31, wherein said optimization factor is a minimum path cost (minC).

40. The apparatus of claim 31, wherein said optimization factor is a minimum network unavailability (minU).

41. The apparatus of claim 31, wherein said optimization factor is a minimum path cost corresponding to a maximum network unavailability (minC/maxU).

42. The apparatus of claim 31, wherein said optimization factor is a minimum network unavailability corresponding to a maximum path cost (minU/maxC).

43. The apparatus of claim 31, wherein said optimization factor is used to calculate a Pareto curve for said BLSR network.

* * * * *